United States Patent Office 3,291,011
Patented Dec. 13, 1966

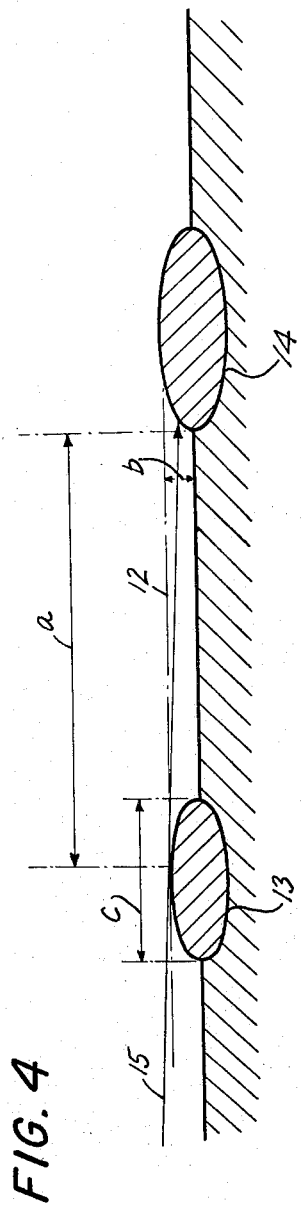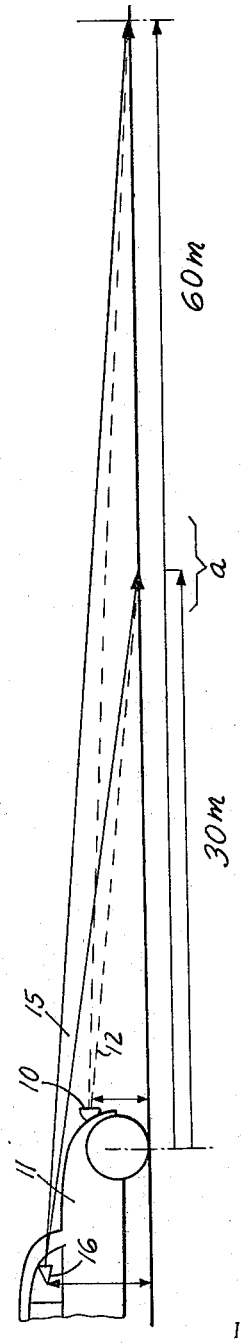

3,291,011
REFLECTIVE SURFACE LAYERS
Hans-Peter Defregger, Munich, Georgi Georgieff, Dusseldorf, and Fritz Hoffmann, Rattingen, near Dusseldorf, Germany, assignors to Ingrid Vogt, Tegernsee, Upper Bavaria, Germany
Filed Jan. 31, 1964, Ser. No. 341,519
11 Claims. (Cl. 94—1.5)

The present invention relates to reflective surface layers, and more particularly to compositions for forming reflective surface layers on objects such as roofs, streets and the like, to methods of forming such compositions, and to the methods of forming the reflective surface layers.

Attempts to provide reflective surfaces on, for example, roofs, streets and the like, which surfaces are reflective but non-glaring, have not given satisfatcory results. Attempts to simply press a grain of a reflective material into the pavement were unsuccessful because the same did not remain adherent to the pavement and were either quickly worn away or blown away.

Attempts to press reflective grains into cast asphalt were also unsuccessful because cast asphalt, in order to have sufficient strength, has in recent times been made with less bitumen and more stone than previously, and the stone acts as a resistance to the pressing into the cast asphalt of the reflective bodies. Consequently, only a limited amount of reflective material can be pressed therein, and the surface of the cast asphalt is given an irregular and unesthetic appearance.

Consequently, prior to the present invention reflective surfaces could only be applied to certain underlying pavement, and even when applied thereto, such reflective surface was not uniform or pleasing in appearance.

It is accordingly a primary object of the present invention to provide a composition for forming reflective surface layers on objects such as roofs, streets and the like, which composition can be used on any underlying surface to give a uniform, pleasing, reflective appearance thereto.

It is another object of the present invention to provide a method of producing the composition which is used for the forming of surface layers in accordance with this invention.

It is yet another object of the present invention to provide a method of forming reflective surface layers on objects, and particularly on roofs, pavement, and the like.

It is yet another object of the present invention to provide for the putting of surface layers on pavement and the like, which surface layers are reflective and long wearing so that the reflective surface remains reflective over a long period of time even when subjected to very heavy traffic.

It is yet another object of the present invention to provide as a composition for forming reflective surface layers on objects such as streets, roofs and the like, a pourable, granular composition which can be stored indefinitely, which can be shipped, and which can be used wherever desired for easy application to any type of surface.

It is another object of the present invention to provide a composition for forming reflective surface layers and method for forming such reflective surface layers, particularly on pavement, such as roadways, sidewalks and the like, which give the possibility of adjusting the degree of reflectivity as desired for the particular place of application.

It is still another object of the present invention to provide for the use of aluminum particles in a composition for and a method of providing reflective surface layers on objects such as roofs, streets and the like which particles need not be spherical or semi-spherical, and which nevertheless, by means of the present invention provide a degree of reflectively substantially equal to that which would be obtained if spherical or semi-spherical particles were initially used exclusively.

Other objects and advantages of the present invention will be apparent from a further reading of the specification and of the appended claims.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 3 and 4 diagrammatically illustrate the reflecting but non-glaring effect achieved by means of this invention.

Figure 1:
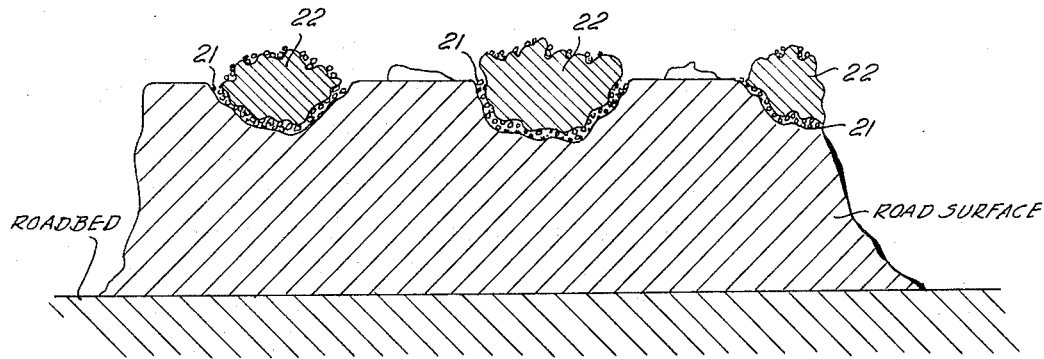
FIG. 1 is a schematic cross-sectional view of a road or pavement incorporating the present invention.

The distribution of bitumen in liquid which is utilized according to the present invention, may be in the form of a stable, bitumen emulsion or a bitumen solution.

In the case of bitumen emulsions, the liquid is generally water. Water is of course most preferred for reasons of availability and economy. The amount of the bitumen in the emulsion is preferably between about 40 and 70% by weight, and most preferably about 50% by weight.

It is generally desirable to stabilize the bitumen in the aqueous emulsion by means of an emulsifying agent. One of the most suitable emulsifying agents for this purposes is bentonite. The emulsifying agent used may be of the ionic or non-ionic type. Among the suitable non-ionic emulsifying agents are reaction products of fatty alcohols with ethylene oxide. The advantageous amphoteric emulsifying agent is casein.

It is most preferred for the purposes of the present invention that the aqueous bitumen emulsion have a pH value in the neutral range, i.e. as close as possible to 7. The reason for this is that both in acid and in alkaline pH range the fine aluminum particles may react with the water, which is not particularly desirable from the standpoint of the present invention.

The emulsions which are used according to the present invention are most preferably those which are known to be "stable" emulsions.

Although stable bitumen emulsions are preferred for the purposes of the present invention, and although in general the further description of the invention below will refer to stable bitumen emulsions, it is pointed out that bitumen solutions can be used in place of the emulsions. The solutions which are preferred are solutions of the bitumen in a relatively volatile organic solvent. Among the suitable solvents which may be used for this purpose are petroleum distillates (benzine hydrocarbons, gasoline and kerosene, boiling in a range of between about 80 and 240° C.), light tar distillate such as benzine, chlorinated hydrocarbons such as carbon tetrachloride, dichloroethane, trichloroethane, and the like. The bitumen solution should contain betaween about 10 and 50% of solvent, most preferably between about 15–30% of the easily volatilizable solvent.

When solutions of this type are used, additives may be included, but are not necessary, particularly in view of the fact that by the use of water-free bitumen solutions, no reaction of the aluminum powder will take place.

The term "bitumen" as used throughout the specification and claims of this case is meant to refer to any of the types of bitumen or asphalt cement, such as ordinary pitch, asphalt, and the like, and stable bitumen emulsions and solutions which are commercially available.

As indicated above, it is preferred to use an aqueous bitumen emulsion containing about 40–70% by weight, and most preferably about 50% by weight of bitumen.

The bitumens which are used according to the present invention ("bitumen" in the United States often being designated as "asphalt cement") are the relatively soft bitumens which have a penetration of 60 or more tenths of a millimeter as measured by the standard test using a needle carrying a load of 100 g., the measurement being taken at 25° C. after 5 seconds penetration.

Although the present invention is described throughout with respect to the use of bitumens, and particularly the preferred bitumens of the type described herein, it should be noted that it is possible to use in place of the bitumens of the present invention artificial thermoplastic resins having variable properties of consistency, etc. The bitumens are preferred for reasons of price, availability, and also the fact that the bitumen will correspond to the base on which the composition of the present invention is applied, when the present invention is used for the forming of a reflective surface layer on pavement. As indicated previously, the present invention will mainly be discussed with relation to the use of stable bitumen emulsions.

The reflective surfaces are formed on an object in accordance with the present invention by distributing onto the surface of the object a mixture of about 60–90 parts by weight, preferably 80 parts by weight, of aluminum granules having a grain size of about 1–5 mm., preferably of about 1–3 mm., and most preferably of about 1–2 mm., about 15–30 parts by weight, preferably about 20 parts by weight, of a stable bitumen emulsion, and about 10–40 parts by weight, preferably about 20 parts by weight, of aluminum powder of a size of less than about 0.2 mm. so as to make a layer of the composition on the surface of the object, and pressing the layer onto the surface of the object at a temperature above about 40° C. so as to cause the layer to adhere to the surface of the object, thereby forming a reflective surface layer on the object.

When forming the reflective surface layer on pavement, such as gutters, sidewalks, or the like, the composition is distributed on the pavement preferably in an amount of about 0.5 kg. to about 5 kg. of the composition per each square meter of pavement. Most preferably the amount of composition used is about 1 kg. to about 3 kg. of the composition per each square meter of the pavement. The thus distributed composition is then pressed onto the pavement at a temperature above about 40° C. so as to cause the layer to adhere to the surface of the pavement and thereby form a reflective surface layer on the pavement.

In accordance with a preferred embodiment of the present invention, there is further distributed on the layer of composition pressed into the pavement at a temperature above about 40° C., aluminum granules having a grain size of about 0.2–1 mm., which aluminum granules layer is then pressed onto the surface layer (of said composition) on the pavement at a temperature above about 40° C., thereby increasing the reflectivity of the surface layer.

The amount of such aluminum granules of a grain size of about 0.2–1 mm. which are distributed on the surface layer of the composition of the present invention pressed onto the pavement is preferably between about 0.25 kg. to about 3 kg. of aluminum granules per each square meter of the surface layer, and most preferably about 0.5 kg. per square meter of the surface layer.

In preparing the composition of the present invention the 60–90 parts by weight of aluminum granules of the grain size between about 1 mm. and 5 mm. are mixed with the about 15–30 parts by weight of the stable bitumen emulsion, which results in the aluminum granules being coated or covered with the emulsion, which coated granules are then further mixed with the about 10 to 40 parts by weight of aluminum powder of a grain size of less than about 0.2 mm.

This results in a pourable particulate composition comprising the large aluminum granules covered by the bitumen emulsion and having small grains of the aluminum powder adhering thereto. Because of the relatively high amount of bitumen and the use of the relatively large and relatively small size particles of aluminum in accordance with the present invention, in addition to the advantages of being able to apply the aluminum-bitumen composition to any type of underlying surface, the additional advantage is obtained that it is possible to use irregularly shaped granules of aluminum instead of using spherical or semi-spherical particles. It is clear from the above, and will be further made clear from the discussion below, that in its broad aspect the present invention comprises as a composition discrete granules of predetermined size of a solid material, preferably a reflective material, most preferably aluminum, coated over at least a portion of its surface with an adhesive body or bodies of a thermoplastic material, which is most preferably bitumen, which in turn is coated with small particles of a reflective material, most preferably of aluminum. These discrete coated granules do not adhere to each other so that the composition in the form of discrete bodies can be poured, spread with a shovel or the like and, of considerable importance, can be stored over prolonged periods of time without the bodies clumping together.

Thus, although the invention is generally discussed herein with respect to large aluminum granules, bitumen, and small aluminum granules, it is apparent that it is possible to use other materials, for example, copper granules, polyvinyl chloride for coating or an aqueous latex emulsion for coating, and small particles of copper, tin, or even glass on the surface and adhering to the large granules by means of the intermediate adhesive.

Referring now more specifically to the drawing, and more particularly to FIG. 1, it will be seen that the road or pavement comprises a road bed supporting a conventional road surface, and that in the upper face of the road surface are partially embedded large aluminum grains 22 of irregular shape, which relatively large aluminum grains are at least partially covered with small particles of aluminum powder 21 which adhere to aluminum grains 22 due to the interposition of bitumen (not shown). One of the large aluminum grains 22 with aluminum powder adhering thereto in an interposed bitumen emulsion (which due to evaporation of the continuous phase eventually will form the bitumen adhesive holding particles 21 to grains 22) is shown in more detail in FIG. 2.

Figure 2:
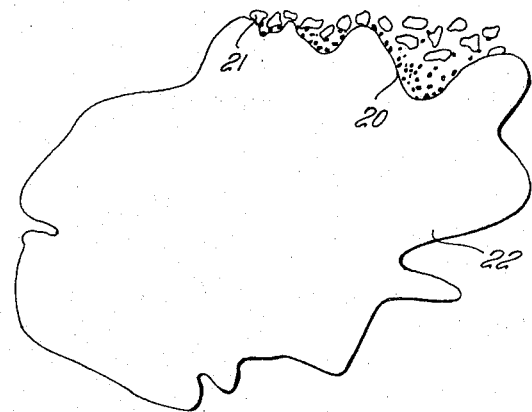
FIG. 2 is a diagrammatic illustration of how the large aluminum granules, bitumen and small grains of powdered aluminum are joined into a unit in accordance with this invention.

FIG. 2 illustrates the interesting structure of the particles which comprise the composition of the present invention, in which a large aluminum grain 22 which most preferably has the grain size of about 1–2 mm., but which may have a grain size of 1–3 mm. or even as much as 1–5 mm., and which has an irregular shape as shown, is coated with the black, emulsified bitumen drops 20, of approximately colloidal size, which are in turn covered with the small particles of aluminum powder 21 having a size of less than about 0.2 mm., for example between about 0.1 mm. and 0.2 mm. The aluminum granule 22 is consequently "breaded" with the bitumen and the small particles of aluminum powder.

As a consequence, the advantages which are obtained are that the aluminum granule 22, although of highly irregular shape, will, in the final composition product of the present invention, approximate the shape of a spherical body with aluminum reflection substantially throughout the surface thereof. In addition, it is possible in accordance with the present invention to use the very high amount of bitumen, of for example 15–30 parts by weight of stable bitumen emulsion for a total composition of 120 parts by weight, without the final product being sticky. Instead, the final product of the present invention remains pourable, and can be stored indefinitely at temperatures below about 40° C., and still remain pourable and easily spreadable. This is due to the fact that the large aluminum granules absorb so much of the bitumen emulsion. This, then has the further advantage, due to the presence of the large amount of bitumen, of having sufficient bitumen always present to enable the composition of the present invention to be spread on any surface and adhered thereto by being pressed onto the surface at a temperature above about 40° C.

As has been stated above, it is not essential that the aluminum granules used according to the present invention be spherical or semi-spherical in order to achieve the desired reflecting effect, and furthermore, it does not matter that the same are deformed by the rollers, for example steam rollers, used to adhere the composition of the present invention to the pavement. The desired effect of reflection without glare is still achieved, as illustrated in FIGS. 3 and 4.

As shown in the FIGS. 3 and 4, a beam of light signified by dashed lines 12 is reflected from a headlight reflector 10 on an automobile 11. This beam of light 12 meets the front edge of the metallic bodies 13 and 14 embedded in the road surface. The angle is extraordinarily acute. The average inclination of the light rays, as well as the inclination of the viewing angle 15 of the driver is in general between 1:25 and 1:50. This means that at an effective distance $a$ between the aluminum particles 13 and 14 in the range of about 5–10 mm., the view is only of a portion $b$ which is in the range of about 0.1–0.3 mm. deep, in the depth between the particles. The driver sees practically only the front rounded area of the reflecting particles 13 and 14, and as to that, actually only the front top portion extending out of the roadway, in a vertical amount of 0.1 to at most 0.3 mm. On the other hand, the horizontal extent $c$, of the for example 1–2 mm. size particle is shortened into a ratio of about 1:50, so that any possible directed reflection into the eyes of the oncoming driver is impossible. In practice, the result is that the surface of the roadway is lighter for the driver, whose eye level is shown at 16, than it is for the oncoming driver.

The following example is given to more fully illustrate the present invention. The scope of the invention is not, however, meant to be limited to the specific details of the example:

EXAMPLE

A mass of aluminum granules having a general grain size of between slightly more than zero to about 3 mm. are by sifting divided into three fractions:

(1) Aluminum powder—smaller than 0.2 mm.;
(2) Aluminum granules of about 0.2–1 mm.;
(3) Aluminum granules larger than 1 mm. (primarily 1–2 mm., with small amounts up to about 3 mm.).

80 parts by weight of the 1–2 mm. granules are thoroughly mixed in a forced mixer with 20 parts by weight of a bituminous emulsion. The emulsion is the commercially available, stable bitumen emulsion containing 50 parts by weight of street-bitumen with a penetration of 200 tenths of a millimeter measured with a needle which is loaded with 100 g. weight, during 5 seconds at 25° C. (known in Germany as bitumen-type "B 200").

After thorough mixing, the granules take on a dark brown coloring. These granules are then mixed with 20 parts by weight of the aluminum powder of a size of less than 0.2 mm. and thoroughly mixed together, whereby the mixture takes on a coloring from bronze to light gray.

After the end of the mixing step, the material is completely pourable and can be stored for a long period of time.

This material is then spread on a hot installed surface of asphaltic concrete in an amount of about 1 kg. per square meter. The material is then rolled onto the asphaltic concrete, for example by means of a steam roller. The aluminum granules which are at first loose and not sticky become sticky under the influence of the hot surface, and quickly adhere into the fine pores of the asphaltic concrete.

At the end, that is before the last pass of the steam roller, an additional amount of 0.5 kg. per square meter of the non-pretreated, blank aluminum granules of the range size 0.2–1 mm. are spread onto the surface and thoroughly distributed by means of a brush. The pass of the steam roller thereover then causes the same to adhere to the surface.

The finished surface is at first colored dark gray. However after several days, under the influence of the traffic, the coloring becomes lighter and lighter. The rub off which is a result of the traffic in combination with dust and moisture results, after a while, in the embedded 1–2 mm. size granules becoming optically completely active.

In accordance with the present invention, results in the aluminum granules being bound in the surface so that as large an amount as possible of the expensive substance is optically fully active.

It has been found that the optical activity of the granules is dependent on the grain size. While the pulverulent granules, that is the small particles of aluminum powder, more or less disappear into the bituminous mortar of the underlayer, the larger granules, particularly those of a size greater than 3 mm., are shattered by the traffic. Also, in the case of larger granules it is of course necessary to have a correspondingly thicker layer must be applied, and there is an increasing tendency of the layer to become glaring upon a light beam being directed thereagainst. Consequently, although it is possible in accordance with the present invention to use as the large granules those of a size of 1–5 mm., it is most preferred, for the reasons given above, and also from the point of view of economy, to use granules of a size of 1–2 mm.

It should be noted that the granules and powered aluminum which are used in accordance with the present invention can be obtained from the waste material from aluminum production and separated into the desired size particles by sifting. In view of the high price of the raw material, it is apparent that this is economical even if the saving of the used aluminum amounts to only 10%.

It is a most important advantage of the present invention, that contrary to known procedures, the use of the composition of the present invention is not at all dependent on the underlying structure, that is on the thickness of the bitumen film of the bituminous granules of the asphaltic concrete or the pore content or pore size of the finished street surface. The composition of the present invention can be applied to any object, and particularly to any type of pavement, independent of the structure thereof, the type thereof, the material from which the same is made, etc. This is due to the treatment of the aluminum granules with the stable bitumen emulsion so as to coat the aluminum granules with the bitumen.

For simplicity of working with a material, it is desirable that the same be as spreadable as possible. This spreadability is on the one hand improved by the sifting of the large granules of aluminum to use those within the most preferred size range of 1–2 mm. On the other hand, it is further improved by the special mixing method of the present invention according to which the aluminum granules are first covered or coated with the bitumen emulsion and then the surface of the granules first powdered with the powdered aluminum of a very small particle size.

In the above example there was used 80 parts of aluminum granules of 1–2 mm. size and 20 parts of aluminum powder of a size of under 0.2 mm. It is of course also possible to use 70 parts of granules of 1–2 mm. size and 30 parts of aluminum powder of a size of less than 0.2 mm.

The ratio of 70:30 is more pourable or dispersible, while the ratio of 80:20 is more quickly adhered to the underlying surface after spreading. In any event, any of the proportions within the present invention can be used to give the desired results.

The degree of adhesiveness after the dispersing arises as a result of the heat which results in an evaporation of the water from the bitumen emulsion and a melting of the bitumen of the emulsion, the softening point of the bitumen being generally about 40° C.

Although it might be thought that all adhesives can be used for coating of the aluminum granules, it has been found that the bitumen which is used in accordance with the present invention is not only much cheaper than any other adhesive for this purpose, but, most surprisingly, that the bitumen does not in any way deleteriously influence the coloring of the aluminum granules. This is apparently due to the fact that the bitumen fills the many pores in the aluminum granules and remain therein without affecting the optical properties which come from the surface of the aluminum wherein no bitumen remains. The high porosity of the granules is of particular advantage resulting from the method of production of the present invention. The material is so porous that despite a specific weight of 2.7 of aluminum granules per se, the material produced according to the present invention has a bulk weight of only 1000–1500 g./l., which means a pore content of 45–60 volume percent.

By the choice of the bituminous binding agent the emulsion is selected which can be mixed in the cold to obtain as the prepared granules a composition which can be stored for a long period of time. Furthermore, the emulsion chosen is preferably such that the pure street-bitumen has a penetration of 200 tenths of a millimeter, because this is the type of street bitumen which is most commonly used, and it is advantageous to use as the binding medium the same type of medium which is found in the pavement itself. Finally, it is advantageous that the binding agent for the covering or coating of the granules have a high wetting power in order to facilitate the penetration into the pores of the granules.

With these considerations, the stable emulsion which is chosen is one which does not coagulate during the mixing with the aluminum granules, but only becomes adhesive upon the evaporation of the water. As a result, the resulting granule composition can be stored for a long period of time, by the simple expedient of keeping it in a closed container in order to prevent evaporation of the water. The composition of the granules can also be filled in plastic sacks and transported in normal manner for use wherever desired.

By the use of 1 kg. of the composition of the present invention per each square meter of the pavement, the surface that is formed is not a closed, smooth surface of aluminum, but a punctiform lightening of the surface with spaces therebetween, in which the black surface remains visible. On the other hand, if the amount is increased to 3 kg. per square meter, the resulting layer is a close-textured layer which to some extent has the appearance of an aluminum sheet in the aphalt. This aluminum sheet is stable as an independent street coating. This type of surface is suitable for use as traffic markings and for the production of chess board arrangements or other patterns in the sidewalks.

If a closed, dense surface film of this type is ground with a grinding disc, what remains is an aluminum plate which is similar to sheet aluminum. The particular advantage of such coating resides in its resistance to shock, its heat conductivity and its high reflection capacity for light and heat, which makes this particular surface useful for other purposes, particularly for roofs. If aluminum granules of the size range of 0.2–1 mm. are coated with the same bitumen emulsion and subsequently powdered with aluminum powder of small size, the resulting material is not sufficiently pourable as in the case of the use of granules of the size of 1–5 mm., and most preferably of 1–2 mm., and consequently cannot be spread and divided except in cold condition. Consequently when granules in the size of 0.2–1 mm. are used, the resulting product cannot be used for the lightening of street surfaces, though the same can be used for the formation of solid coatings or for the production of irregular patterns (marble-like from black coatings).

Finally, it is possible from the granules of 0.2–1 mm. size, possibly in admixture with aluminum powder of a size of less than 0.2 mm., to form a bituminous slurry. It has been found that an addition of about 25% of powdered stone is advantageous in such case in order to keep the aluminum granules in the bituminous emulsion without settling. Otherwise, it is only with great difficulty that such slurry can be made homogeneous.

The method and composition of the present invention can be used for the lightening of old street surfaces. In this case, the prepared granular composition of the present invention is spread on the surface after the old surface has been first coated with a thin layer of bitumen. The heat necessary for binding the granules to the surface is obtained in sufficient amount from the steam roller or the like which is used for pressing the granular composition onto the surface.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Composition for forming reflective surface layers on objects such as roofs, streets and the like, said composition comprising a pourable, uniformly distributed mixture of about 60–90 parts by weight of aluminum granules having a grain size of about 1–5 mm., about 15–30 parts by weight of a stable distribution of bitumen in a liquid, and about 10–40 parts by weight of aluminum powder of a size of less than about 0.2 mm.

2. Method of producing a composition useful for forming the reflective surface layers on objects such as streets, roofs, and the like, which comprises uniformly mixing about 60–90 parts by weight of aluminum granules having a grain size of about 1–5 mm. with about 15–30 parts by weight of a stable distribution of bitumen in a liquid so as to form a uniform mixture thereof in which said bitumen adheres to said aluminum granules, and further mixing the resulting uniform mixture with about 10–40 parts by weight of aluminum powder having a size of less than about 0.2 mm. so as to cause said aluminum powder to be uniformly distributed on said aluminum granules to which said bitumen is adhered, thereby forming a pourable, reflective composition that can be adhered to objects to form reflective coating thereon.

3. Method of forming a reflective surface layer on an object, which comprises distributing on the surface of said object a composition comprising a mixture of about 60–90 parts by weight of aluminum granules having a grain size of about 1–5 mm., about 15–30 parts by weight of a stable bitumen emulsion, and about 10–40 parts by weight of aluminum powder of a size of less than about 0.2 mm. so as to make a layer of said composition on the surface of said object; and pressing said layer onto the surface of said object at a temperature above about 40° C. so as to cause said layer to adhere to the surface of said object, thereby forming a reflective surface layer on said object.

4. Method of forming a reflective surface layer on pavement, which comprises distributing on said pavement a composition comprising a mixture of about 60–90 parts by weight of aluminum granules having a grain size of about 1–5 mm., about 15–30 parts by weight of a stable bitumen emulsion, and about 10–40 parts by weight of aluminum powder of a size of less than about 0.2 mm. so as to make a layer of said composition on said pavement; and pressing said layer onto said pavement at a temperature above about 40° C. so as to cause said layer to adhere to the surface of said pavement, thereby forming a reflective surface layer on said pavement.

5. Method of forming a reflective surface layer on pavement, which comprises distributing on said pavement a composition comprising a mixture of about 60–90 parts by weight of aluminum granules having a grain size of about 1–5 mm., about 15–30 parts by weight of a stable bitumen emulsion, and about 10–40 parts by weight of aluminum powder of a size of less than about 0.2 mm. in an amount of about 0.5 kg. to about 5 kg. of said composition per each square meter of said pavement so as to make a layer of said composition on said pavement; and pressing said layer onto said pavement at a temperature above about 40° C. so as to cause said layer to adhere to the surface of said pavement, thereby forming a reflective surface layer on said pavement.

6. Method of forming a reflective surface layer on an object, which comprises distributing on the surface of said object a composition comprising a mixture of about 60–90 parts by weight of aluminum granules having a grain size of about 1–5 mm., about 15–30 parts by weight of a stable bitumen emulsion, and about 10–40 parts by weight of aluminum powder of a size of less than about 0.2 mm. so as to make a layer of said composition on the surface of said object; pressing said layer onto the surface of said object at a temperature above about 40° C. so as to cause said layer to adhere to the surface of said object, thereby forming a reflective surface layer on said object; distributing aluminum granules having a grain size of about 0.2–1 mm. on said surface layer on said object; and pressing said aluminum granules onto the surface layer of said object at a temperature above about 40° C., thereby increasing the reflectivity of said surface layer.

7. Method of forming a reflective surface layer on pavement, which comprises distributing on said pavement a composition comprising a mixture of about 60–90 parts by weight of porous aluminum granules having a grain size of about 1–5 mm., about 15–30 parts by weight of a stable bitumen emulsion filling the pores of said porous aluminum granules, and about 10–40 parts by weight of aluminum powder of a size of less than about 0.2 mm. so as to make a layer of said composition on said pavement; pressing said layer onto said pavement at a temperature above about 40° C. so as to cause said layer to adhere to the surface of said pavement, thereby forming a reflective surface layer on said pavement; distributing aluminum granules having a grain size of about 0.2–1 mm. on said surface layer on said pavement; and pressing said aluminum granules onto the surface layer of said pavement at a temperature above about 40° C., thereby increasing the reflectivity of said surface layer.

8. Method of forming a reflective surface layer on pavement, which comprises distributing on said pavement a composition comprising a mixture of about 60–90 parts by weight of aluminum granules having a grain size of about 1–5 mm., about 15–30 parts by weight of a stable bitumen emulsion, and about 10–40 parts by weight of aluminum powder of a size of less than about 0.2 mm. in an amount of about 0.5 kg. to about 5 kg. of said composition per each square meter of said pavement so as to make a layer of said composition on said pavement; pressing said layer onto said pavement at a temperature above about 40° C. so as to cause said layer to adhere to the surface of said pavement, thereby forming a reflective surface layer on said pavement; distributing aluminum granules having a grain size of about 0.2–1 mm. on said surface layer on said pavement in an amount of about 0.25 kg. to about 3 kg. of said aluminum granules per each square meter of said surface layer; and pressing said aluminum granules onto the surface layer of said pavement at a temperature above about 40° C., thereby increasing the reflectivity of said surface layer.

9. Method of producing a composition useful for forming the reflective surface layers on objects such as streets, roofs, and the like, which comprises uniformly mixing about 60–90 parts by weight of porous aluminum granules having a grain size of about 1–5 mm. with about 15–30 parts by weight of a solution of bitumen in a volatile organic solvent therefor so as to form a uniform mixture thereof in which said bitumen fills the pores of said porous aluminum granules, and further mixing the resulting uniform mixture with about 10–40 parts by weight of aluminum powder having a size of less than about 0.2 mm. so to cause said aluminum powder to be uniformly distributed on said aluminum granules to which said bitumen is adhered, thereby forming a pourable, reflective composition that can be adhered to objects to form a reflective coating thereon.

10. Composition for forming reflective surface layers on objects such as roofs, streets and the like, said composition comprising a pourable, uniformly distributed mixture of about 60–90 parts by weight of porous aluminum granules having a grain size of about 1–5 mm., about 15–30 parts by weight of a stable distribution of bitumen in a liquid, said bitumen filling the pores of said porous aluminum granules and having a softness as measured by the penetration of a needle loaded with 100 g. in 5 seconds at 25° C. of at least 60 tenths of a millimeter, and about 10–40 parts by weight of aluminum powder of a size of less than about 0.2 mm.

11. Composition for forming reflective surface layers on objects such as roofs, streets and the like, said composition comprising a pourable mixture of a major proportion of slightly porous aluminum granules having a grain size of between 1–5 mm., a bitumen emulsion substantially filling the pores of said slightly porous aluminum granules, and alumnium powder substantially covering said slightly porous aluminum granules with said bitumen emulsion filling the pores thereof.

References Cited by the Examiner

UNITED STATES PATENTS

| | | | |
|---|---|---|---|
| 1,986,591 | 1/1935 | Meyer | 94—1.5 |
| 2,366,754 | 1/1945 | Rodli | 94—1.5 |
| 2,488,252 | 11/1949 | Wood | 106—281 |

JACOB L. NACKENOFF, *Primary Examiner.*